US007218910B2

(12) United States Patent
Okahashi

(10) Patent No.: US 7,218,910 B2
(45) Date of Patent: May 15, 2007

(54) HIGH IMPEDANCE CIRCUIT

(75) Inventor: Tetsuhide Okahashi, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 587 days.

(21) Appl. No.: 10/197,486

(22) Filed: Jul. 18, 2002

(65) Prior Publication Data

US 2003/0022653 A1     Jan. 30, 2003

(30) Foreign Application Priority Data

Jul. 26, 2001  (JP)  ............................. 2001-226744

(51) Int. Cl.
H04B 1/16    (2006.01)
H04B 17/00   (2006.01)
H04B 1/10    (2006.01)
(52) U.S. Cl. ................... 455/334; 455/67.13; 455/296; 363/97; 363/131
(58) Field of Classification Search ........ 455/334–338, 455/340–341, 307–308, 296, 293, 311, 3.02, 455/3.06, 63.1, 67.11, 67.13, 114.2, 114.3, 455/115.1, 217, 263, 284, 3.11, 63.2, 62.13, 455/3–7; 363/21, 97, 131, 20, 56
See application file for complete search history.

(56) References Cited

U.S. PATENT DOCUMENTS

| 4,112,337 | A | * | 9/1978 | Nagasaki et al. ............ 315/411 |
| 4,540,956 | A | * | 9/1985 | Chauvin et al. ......... 331/116 R |
| 4,654,645 | A | | 3/1987 | Yamagishi |
| 4,989,264 | A | * | 1/1991 | Ohto ........................... 455/266 |
| 5,206,954 | A | | 4/1993 | Inoue et al. |
| 5,208,547 | A | * | 5/1993 | Schindler ..................... 330/54 |
| 5,534,825 | A | | 7/1996 | Goma et al. |
| 5,539,359 | A | | 7/1996 | Goma |
| 5,598,324 | A | * | 1/1997 | Imamura et al. .......... 363/21.02 |
| 5,649,311 | A | | 7/1997 | Somei |
| 5,959,592 | A | * | 9/1999 | Petruzzelli .................... 725/68 |
| 6,081,168 | A | * | 6/2000 | Park ............................ 331/179 |
| 6,157,269 | A | * | 12/2000 | Orr ......................... 331/117 D |

(Continued)

FOREIGN PATENT DOCUMENTS

JP         61-247131         11/1986

(Continued)

Primary Examiner—Tony T. Nguyen
(74) Attorney, Agent, or Firm—Birch, Stewart, Kolasch & Birch, LLP

(57) ABSTRACT

A high impedance circuit of the present invention includes an LC parallel resonance circuit for raising circuit impedance, and a diode, which is connected in parallel to the LC parallel resonance circuit, causing a loop current to flow back via the diode and an inductor in the LC parallel resonance circuit so that a counter electromotive force, due to a surge voltage, which occurs across the inductor is cancelled. A low noise block downconverter which includes a high impedance circuit having a high impedance prevents peripheral circuits from being destroyed by a counter electromotive force, due to a surge voltage, which occurs across the inductor. For this, a diode is provided to cause a loop current to flow back via the diode and the inductor so that the counter electromotive force is cancelled. This makes it possible to cancel the counter electromotive force, to lower the voltage across the inductor to a forward voltage of the diode, and to prevent the destruction of the peripheral circuits such as the high impedance circuit.

2 Claims, 4 Drawing Sheets

U.S. PATENT DOCUMENTS 6,411,170 B2 * 6/2002 Hino ................. 331/117 R
6,462,716 B1 * 10/2002 Kushihi ................. 343/860

FOREIGN PATENT DOCUMENTS

| JP | 03-73046 | 7/1991 |
| JP | 5-90500 | 4/1993 |
| JP | 07-074665 | 3/1995 |
| JP | 9-266626 | 10/1997 |

* cited by examiner

HIGH IMPEDANCE CIRCUIT

FIELD OF THE INVENTION

The present invention relates to a high impedance circuit which is provided with an LC parallel resonance circuit for raising circuit impedance at an input stage of a circuit having a circuit with a relatively low impedance, in order to increase a level of signal input to the circuit, which is determined by a relative ratio of circuit impedance to impedance of components such as lines and a signal source. Especially, the present invention relates to enhancement of its protection level against a surge voltage.

BACKGROUND OF THE INVENTION

FIG. 4 is a block diagram of an electrical arrangement of a Low Noise Block downconverter (hereinafter referred to as LNB) 1 which is a typical high impedance circuit of prior art. An LNB, a component which is mounted at the end of antennas such as a BS (Broadcasting Satellite) antenna and a CS (Communications Satellite) antenna, receives and amplifies signals of the order of 12 GHz band transmitted from a satellite, further converts the amplified signals into intermediate frequency signals (hereinafter referred to as IF signal) of the order of 1 GHz band, and outputs the IF signals to a receiver not shown. The LNB 1, which is used for both BS and CS, is provided with respective receiving horns 2 and 3. The LNB 1 selects a target satellite for receiving signals in response to a control pulse sent from the receiver not shown. For this, for example, the control pulse of a maximum amplitude (Vs)=1 $V_{P\text{-}P}$ and a frequency (f)=22 kHz is supplied to a terminal 4 via a cable not shown.

That is, the LNB 1 is a high impedance circuit which is provided in a system for receiving satellite broadcasts.

The LNB 1 generally includes a high impedance circuit 5, a low impedance circuit 6 to which a direct current for power source is supplied from the terminal 4, and an LC parallel resonance circuit 7 which is provided between the terminal 4 and the low impedance circuit 6. The high impedance circuit 5 outputs the IF signal to the terminal 4 and is supplied the control pulse from the terminal 4. The low impedance circuit 6 includes a regulator IC 8 which carries out the supply of electricity to the high impedance circuit 5. Also, at the input side of the low impedance circuit 6 provided is an input pass capacitor c1 so as to prevent the oscillation of the regulator IC 8. This causes the low impedance circuit 6 to have a low impedance.

For this, the LC parallel resonance circuit 7 is provided so as to electrically separate the regulator IC 8 having a low impedance from the control pulse. The LC parallel resonance circuit 7 includes an inductor 1 and a capacitor c2 which are connected in parallel, and the value of its resonance frequency agrees with the control pulse's frequency of 22 kHz. A constant of LC is determined by the equation: $f=1/(2\pi\sqrt{LC})$. This allows the LC parallel resonance circuit 7 to have a high impedance with respect to the control pulse.

The regulator IC 8 generates a predetermined level of power supply voltage by using the direct current for power source supplied via the LC parallel resonance circuit 7 to carry out the supply of electricity to a signal amplifying and frequency converting circuit 9 and a pulse detecting circuit 10 which are included in the high impedance circuit 5.

The pulse detecting circuit 10 is caused by the power supplied from the regulator IC 8 to output a satellite selecting instruction to select a target satellite for receiving signals to the signal amplifying and frequency converting circuit 9, in response to the control pulse transmitted from the receiver. The signal amplifying and frequency converting circuit 9 is caused by the power supplied from the regulator IC 8 to switch between the receiving horn 2 and the receiving horn 3 in response to the satellite selecting instruction sent from the pulse detecting circuit 10. Then, the signal amplifying and frequency converting circuit 9 receives and amplifies signals of the BS broadcast or the CS broadcast, further converts the signals into IF signals, and outputs the IF signals from a coupling capacitor c3 to the receiver via the terminal 4.

Here, the signal input level of the control pulse supplied to the pulse detecting circuit 10 is determined by a relative ratio of an output impedance of the receiver as a signal source, an impedance of lines such as a cable, an input impedance of the pulse detecting circuit 10, to the LC parallel resonance circuit 7. However, a small level of signal input causes the pulse detecting circuit 10 to misread signals. It is therefore important that the LNB 1, which is set at the places such as a rooftop of a house using a long cable, has the input impedance much larger than the impedance of the cable to keep a large level of the signal input to the LNB 1. Further, the LNB 1, which is set at the places such as a rooftop, may be hit by a stroke of lightning, so that it is necessary for the LNB 1 to withstand the lightning stroke.

Therefore, the high impedance circuit 5 is caused to have a high input impedance. Further, the direct current for power source is supplied to the high impedance circuit 5. At an input stage of the low impedance circuit 6 which is caused to have a low input impedance by the input pass capacitor c1, provided is the LC parallel resonance circuit 7 for raising circuit impedance. Adjustment of the resonance frequency as described previously causes the LC parallel resonance circuit 7 to occur resonance when the control pulse is inputted, so that a high impedance is developed in the LC parallel resonance circuit 7. At this point, the circuits seen from an input side are the high impedance circuit 5 and the LC parallel resonance circuit 7. That is, the high impedance causes the control pulse to be inputted to the pulse detecting circuit 10 at the sufficient level of the signal input.

In the LNB 1 which is arranged as described above, a surge absorber zd is provided to withstand surge voltage caused by sources such as a lightning. However, there is a problem that the addition of the surge voltage causes counter electromotive force which is many times larger than the surge voltage across the inductor 1 polarized as shown in FIG. 4, resulting in the destruction of peripheral circuits such as the high impedance circuit 5.

SUMMARY OF THE INVENTION

An object of the present invention is to provide a high impedance circuit which uses an LC parallel resonance circuit withstanding surge voltage.

A high impedance circuit of the present invention, includes:

an LC parallel resonance circuit for raising circuit impedance; and a diode, which is connected in parallel to the LC parallel resonance circuit, causing a loop current to flow back via the diode and an inductor in the LC parallel resonance circuit so that a counter electromotive force, due to a surge voltage, which occurs across the inductor is cancelled.

Here, in the high impedance circuit which is provided with the LC parallel resonance circuit at an input stage of a circuit having a relatively low impedance in order to increase a level of signal input to the circuit, which is determined by a relative ratio of circuit impedance to impedance of components such as lines and a signal source, a momentary application of a high voltage (surge voltage) resulting from sources such as lightning causes counter electromotive force many times larger than the surge voltage across an inductor, thereby destroying peripheral circuits. However, according to the arrangement of the present invention, a diode is provided in parallel to an LC parallel resonance circuit so as to make a loop current flow back in the forward direction with respect to the counter electromotive force.

This makes it possible to cancel the counter electromotive force, and to lower the voltage across the inductor to a forward voltage $V_F$ of the diode, thereby realizing a function of surge protection to prevent the destruction of the peripheral circuits.

For a fuller understanding of the nature and advantages of the invention, reference should be made to the ensuing detailed description taken in conjunction with the accompanying drawings.

DESCRIPTION OF THE EMBODIMENTS

One embodiment of the present invention will be described as follows.

Figure 1:
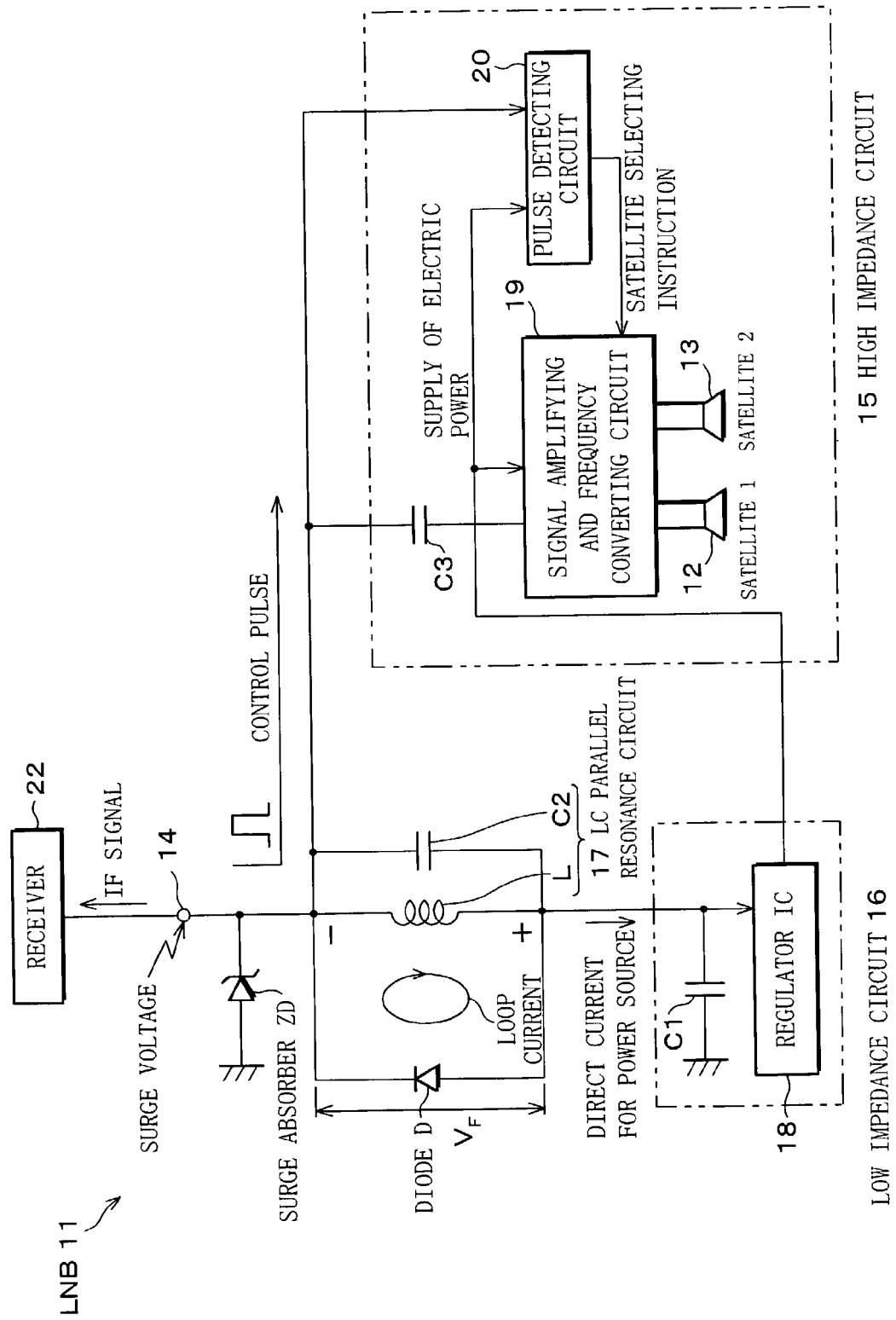
FIG. 1 is a block diagram showing an electrical arrangement of an LNB that is a high impedance circuit in one embodiment of the present invention.

FIG. 1 is a block diagram showing an electrical arrangement of an LNB 11 that is a high impedance circuit in one embodiment of the present invention. The LNB 11, which is used for both BS and CS, is provided with respective receiving horns 12 and 13. The LNB 11 selects a target satellite for receiving signals in response to a control pulse sent from a receiver 22. For this, for example, the control pulse of a maximum amplitude (Vs)=600 $mV_{P-P}$ and a frequency (f)=22 kHz is supplied from the receiver 22 to a terminal 14 via a cable.

The LNB 11 generally includes a high impedance circuit (receiving circuit) 15, a low impedance circuit 16 to which a direct current for power source is supplied from the terminal 14, and an LC parallel resonance circuit 17 which is provided between the terminal 14 and the low impedance circuit 16. The high impedance circuit 15 outputs the IF signal to the terminal 14 and is supplied the control pulse from the terminal 14. The low impedance circuit 16 includes a regulator IC 18 which carries out the supply of electricity to the high impedance circuit 15. Also, at the input side of the low impedance circuit 16 provided is an input pass capacitor C1 so as to prevent the oscillation of the regulator IC 18. This causes the low impedance circuit 16 to have a low impedance.

For this, the LC parallel resonance circuit 17 is provided so as to electrically separate the regulator IC 18 having a low impedance from the control pulse. The LC parallel resonance circuit 17 includes an inductor L and a capacitor C2 which are connected in parallel, and the value of its resonance frequency agrees with the control pulse's frequency of 22 kHz. This allows the LC parallel resonance circuit 17 to have a high impedance with respect to the control pulse.

The regulator IC 18 generates a predetermined level of power supply voltage by using the direct current for power source supplied via the LC parallel resonance circuit 17 to carry out the supply of electricity to a signal amplifying and frequency converting circuit 19 and a pulse detecting circuit 20 which are included in the high impedance circuit 15.

The pulse detecting circuit 20 is caused by the power supplied from the regulator IC 18 to output a satellite selecting instruction to select a target satellite for receiving signals to the signal amplifying and frequency converting circuit 19, in response to the control pulse transmitted from the receiver 22. The signal amplifying and frequency converting circuit 19 is caused by the power supplied from the regulator IC 18 to switch between the receiving horn 12 and the receiving horn 13 in response to the satellite selecting instruction sent from the pulse detecting circuit 20. Then, the signal amplifying and frequency converting circuit 19 receives and amplifies signals of the BS broadcast or the CS broadcast, further converts the signals into IF signals, and outputs the IF signals from a coupling capacitor C3 to the receiver 22 via the terminal 14.

Further, a surge absorber ZD is provided to withstand surge voltage caused by lightning. However, the addition of the surge voltage causes counter electromotive force which is many times larger than the surge voltage across the inductor L polarized as shown in FIG. 1. Consequently, according to the present invention, the diode D is connected to the LC parallel resonance circuit 17 in parallel, and a loop current is caused to flow back via the diode D and the inductor L so that counter electromotive force, due to a low level of surge voltage, which occurs across the inductor L is cancelled.

Therefore, it is possible to cancel the counter electromotive force caused by the low level of surge voltage and to lower voltage across the inductor L to a forward voltage $V_F$ of the diode D, thereby realizing a function of surge protection to prevent the destruction of peripheral circuits such as the high impedance circuit 15.

Further, since the diode D is disposed closely to the inductor L of the LC parallel resonance circuit 17 as far as possible, it is possible to more effectively reduce the counter electromotive force which occurs across the inductor L.

Figure 2:
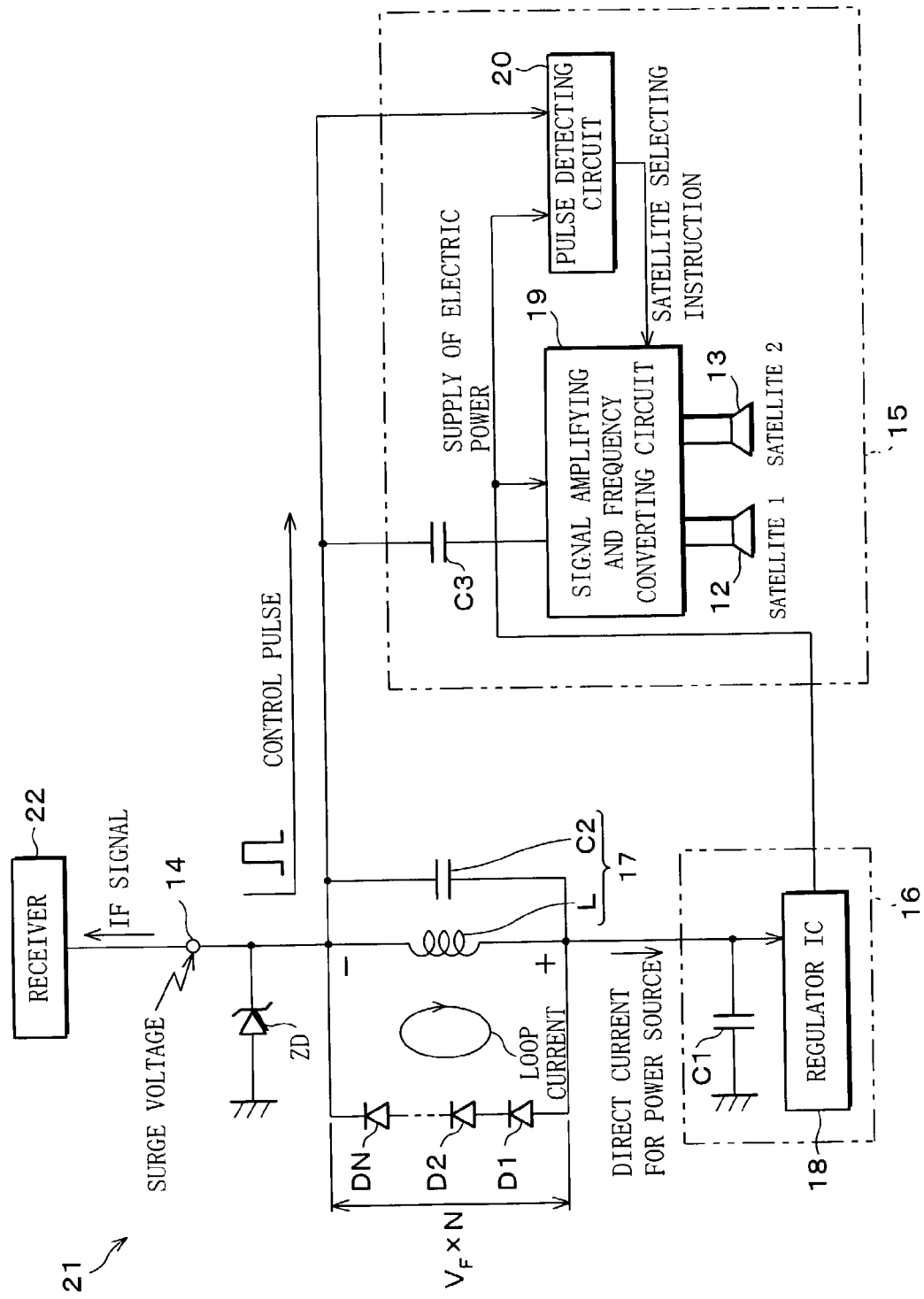
FIG. 2 is a block diagram showing another example of the LNB shown in FIG. 1.

Note that, when it is $Vs \geq V_F$ where Vs is the amplitude of the control pulse which is an alternating current, the control pulse is bypassed by the diode D and is not inputted to the pulse detecting circuit 20. In such a case, as shown in the LNB 21 of FIG. 2, N (N≧2) number of diodes (diodes D1, D2, ... DN) which satisfies $Vs < V_F \times N$ may be connected in series. In this case, the counter electromotive force added to the peripheral circuits becomes $V_F \times N$ as described above. Since other arrangement in the LNB 21 is the same as that of the LNB 11 as described previously, the same reference numerals are given to each of the corresponding parts, and the explanation thereof is omitted.

That is, if the forward voltage of the diodes connected in series is smaller than the counter electromotive force, it is possible to realize the function of the surge protection.

Another embodiment of the present invention will be described below.

Figure 3:
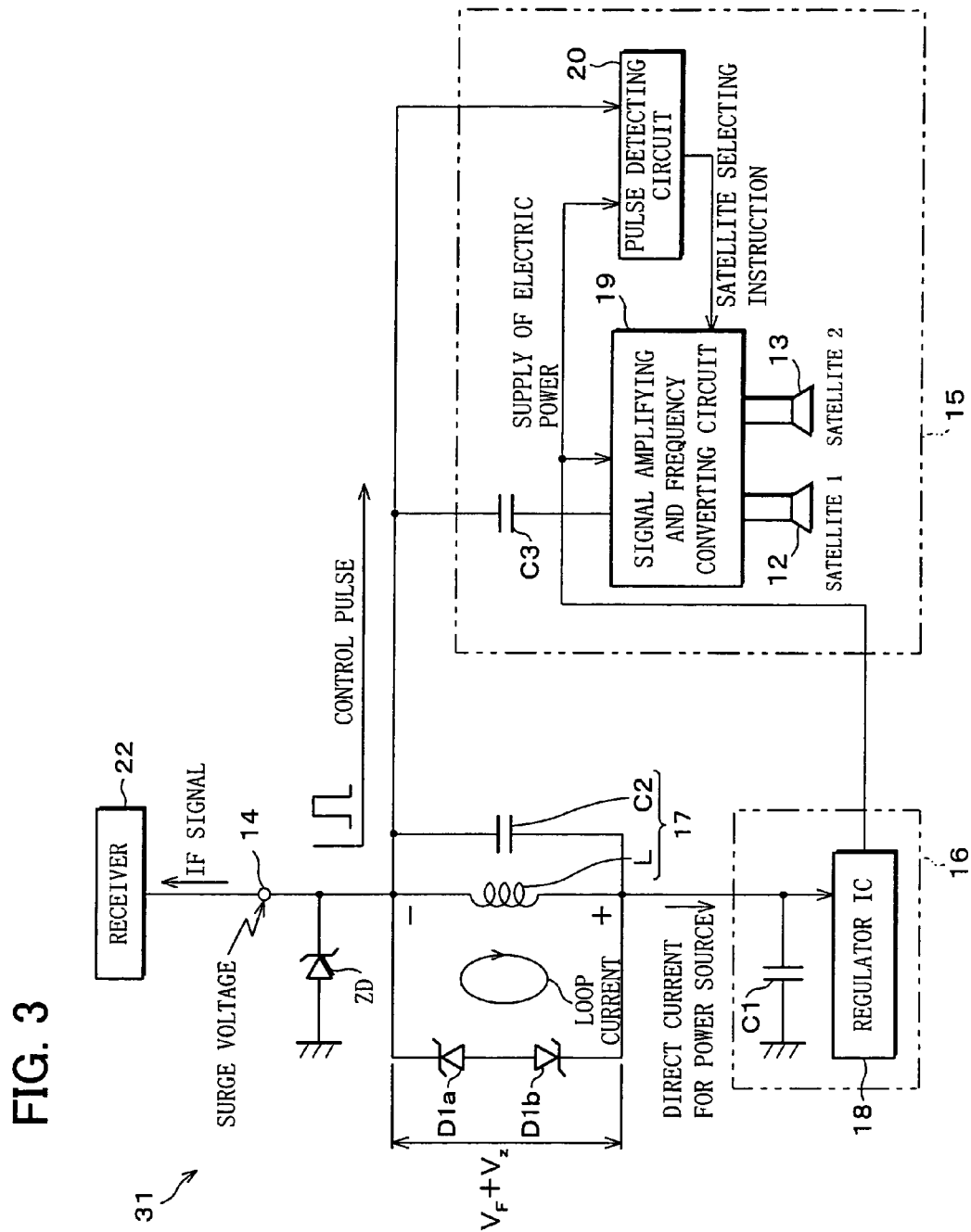
FIG. 3 is a block diagram showing an electrical arrangement of an LNB of another embodiment of the present invention.
Figure 4:
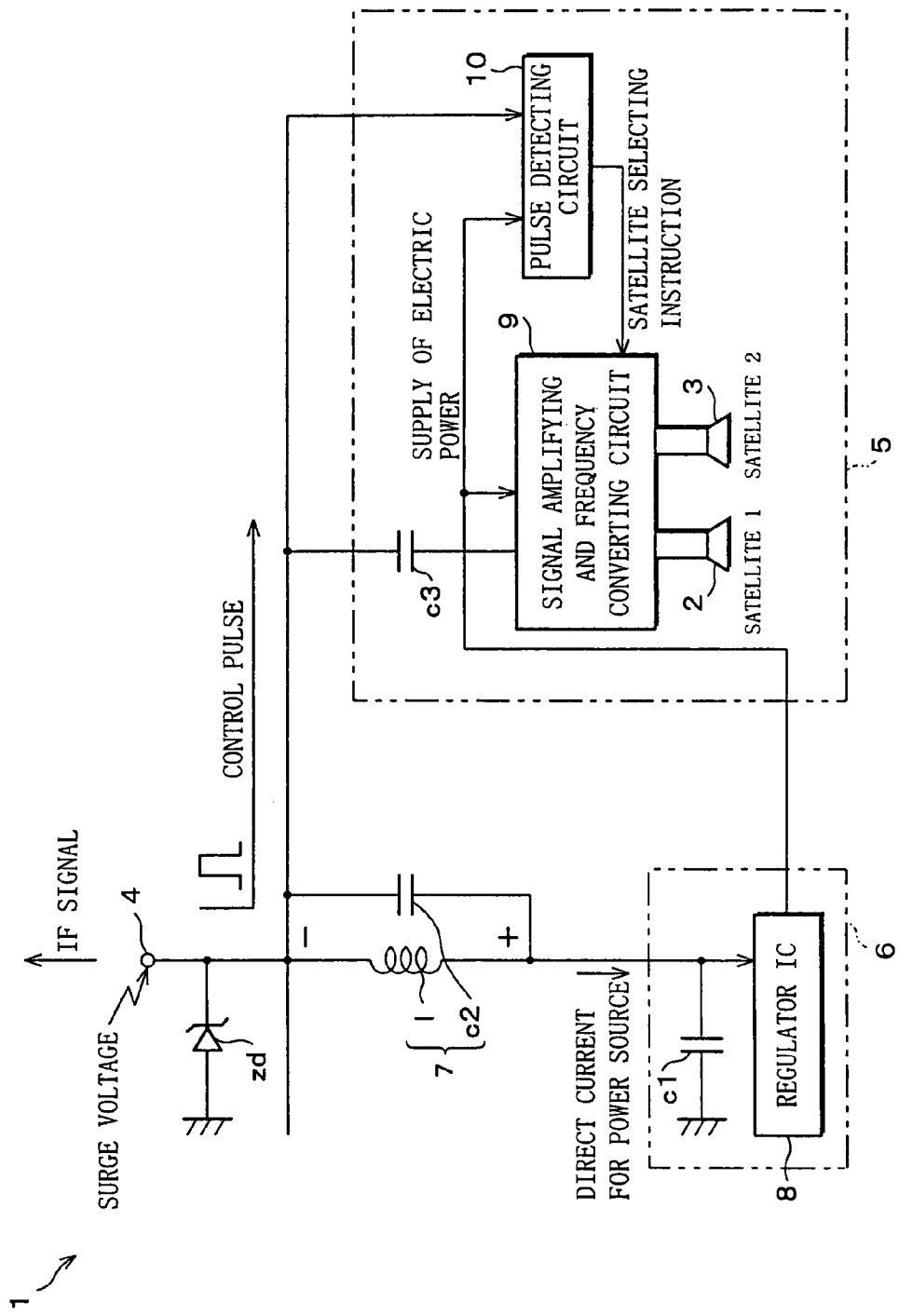
FIG. 4 is a block diagram showing an electrical arrangement of a typical LNB of prior art.

FIG. 3 is a block diagram showing an electrical arrangement of an LNB 31 in another embodiment of the present invention. Since the LNB 31 is similar to the LNB 21 as described previously, the same reference numerals are given to each of the corresponding parts, and the explanation thereof is omitted. A notable point in the embodiment is that the LNB 31 includes a pair of counter serial zener diodes D1a and D1b. Zener voltage $V_Z$ of the counter serial zener diodes D1a and D1b is set so as to satisfy $Vs<V_F+V_Z$. For example, since the forward voltage $V_F=0.7V$ when maximum amplitude (Vs)=1 $V_{P-P}$ as described above, it is set to $V_Z=2V$ for leeway.

In a steady state, such an arrangement allows the zener diodes D1a and D1b to carry no current without decrease of impedance. On the other hand, application of a low-level surge voltage being approximately several kilovolts allows the zener diodes D1a and D1b to carry a current.

Therefore, in the LNB 21 as described previously, as the value of the maximum amplitude Vs increases, the number of diodes for use increases. This is uneconomical in view of manufacturing cost and space for mounting. In contrast, in case of the counter serial zener diodes D1a and D1b, the number of elements is always two. Thus, it is possible to reduce the manufacturing cost and the space for mounting. Further, it is possible to reduce the counter electromotive force added to the peripheral circuits to $V_F+V_Z$ as described above.

As described above, the pulse detecting circuit 20 that outputs the satellite selecting instruction is included in the high impedance circuit 15 for increasing the level of the signal input to circuits, which is determined by a relative ratio of circuit impedance to impedances of components such as a line and a signal source. Further, as described previously, in the LNB 11 which is caused to have a high impedance by the LC parallel resonance circuit 17 provided at the input stage of the low impedance circuit 6 of the regulator IC 18 which carry out the supply of power to the signal amplifying and frequency converting circuit 19 and the pulse detecting circuit 20, it is arranged so as to prevent the peripheral circuits from being destroyed by the counter electromotive force which is caused by the surge voltage across the inductor L.

That is, the diode D is provided to cause a loop current flow back via the diode D and the inductor L so that the counter electromotive force is cancelled. This makes it possible to cancel the counter electromotive force, to lower the voltage across the inductor to the forward voltage $V_F$ of the diode D, and to prevent the destruction of the peripheral circuits such as the high impedance circuit 15.

As described above, a high impedance circuit of the present invention, includes:

an LC parallel resonance circuit for raising circuit impedance; and a diode, which is connected in parallel to the LC parallel resonance circuit, causing a loop current to flow back via the diode and an inductor in the LC parallel resonance circuit so that a counter electromotive force, due to a surge voltage, which occurs across the inductor is cancelled.

Therefore, since the diode is provided in parallel to the LC parallel resonance circuit, and a loop current is made to flow back, it is possible to cancel the counter electromotive force. Further, since the voltage across the inductor can be lowered to the forward voltage $V_F$ of the diode D, it is possible to realize a function of surge protection for preventing the destruction of peripheral circuits.

Further, in the high impedance circuit of the present invention, a pair of counter serial zener diode is used as the above diode.

Here, the amplitude of a control pulse to be high impedance is denoted, for example, as Vs. Then, in case of only a diode that makes the flow of a current in the forward direction in accordance with the counter electromotive force thus generated, it is necessary to serially connect N number of diodes which satisfies $Vs<V_F\times N$ in order not to make the signal pulse flow in the forward direction of the diode. In contrast, according to the above arrangement, addition of a zener diode in the reverse direction makes the pair of counter serial zener diodes with respect to the counter electromotive force thus generated.

In such a case, it is possible not to make the control pulse flow into the regulator IC 18 when it is $Vs<V_F+V_Z$ where the zener voltage of the zener diode is $V_Z$. Also, it is possible to prevent the destruction of the peripheral circuits by lowering the voltage across the inductor to the sum of the forward voltage $V_F$ of the diode and the zener voltage $V_Z$ of the zener diode. Further, the number of diodes for use is always two, so that it is possible to reduce a manufacturing cost and a space for mounting.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A low noise block downconverter, comprising:
    (a) a receiving circuit for selecting a target broadcast and receiving signals from a satellite of a broadcast thus selected in response to a control pulse for selecting a target satellite, which is transmitted from a receiver, and for amplifying signals thus received and outputting the signals to the receiver;
    (b) a regulator IC producing a source voltage for being supplied to said receiving circuit in accordance with a direct current for power source inputted to said regulator IC;
    (c) an LC parallel resonance circuit electrically separating said regulator IC from the control pulse; and
    (d) a diode, which is connected in parallel to said LC parallel resonance circuit, causing a loop current to flow back via said diode and an inductor in said LC parallel resonance circuit so that a counter electromotive force, due to a surge voltage, which occurs across the inductor is cancelled.

2. A system for receiving satellite broadcasts, comprising:
a receiver outputting a control pulse for selecting a target satellite; and
a low noise block downconverter, including:
    (a) a receiving circuit for selecting a target broadcast and receiving signals from a satellite of a broadcast thus selected in response to the control pulse, and for amplifying and outputting signals thus received;
    (b) a regulator IC producing a source voltage for being supplied to said receiving circuit in accordance with a direct current for power source inputted to said regulator IC;
    (c) an LC parallel resonance circuit electrically separating said regulator IC from the control pulse;
    (d) a diode, which is connected in parallel to said LC parallel resonance circuit, causing a loop current to flow back via said diode and an inductor in said LC parallel resonance circuit so that a counter electromotive force, due to a surge voltage, which occurs across the inductor is cancelled.

* * * * *